US007213586B2

(12) United States Patent
Wilson et al.

(10) Patent No.: US 7,213,586 B2
(45) Date of Patent: May 8, 2007

(54) EXHAUST GAS RECIRCULATION VALVE

(75) Inventors: Joseph A. Wilson, Royal Oak, MI (US); Micheal Hopkins, Jr., Clarkston, MI (US); James T. McIntyre, Sterling Heights, MI (US); Guy L. Abbitt, Goodrich, MI (US); Robert S. Czarnowski, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/196,050

(22) Filed: Aug. 3, 2005

(65) Prior Publication Data

US 2006/0032485 A1 Feb. 16, 2006

Related U.S. Application Data

(60) Provisional application No. 60/600,844, filed on Aug. 12, 2004.

(51) Int. Cl.
*F02M 25/07* (2006.01)
*F02B 47/08* (2006.01)
*F16K 25/00* (2006.01)

(52) U.S. Cl. .................................. 123/568.11; 251/368

(58) Field of Classification Search ............. 123/188.3, 123/668, 669, 568.11, 568.21, 568.29; 251/318, 251/332, 368
See application file for complete search history.

(56) References Cited

U.S. PATENT DOCUMENTS 2,056,042 A * 9/1936 Fausek et al. .............. 251/339
4,106,449 A * 8/1978 Matsumoto et al. ... 123/568.29
4,443,172 A * 4/1984 Riley et al. ................. 425/112
4,460,284 A 7/1984 Lauterbach et al.
4,612,880 A 9/1986 Brass et al.
4,649,703 A 3/1987 Dettling et al.
5,089,237 A 2/1992 Schuster et al.
5,186,135 A * 2/1993 Kovach ................... 123/188.3
5,205,170 A 4/1993 Blechinger et al.
5,249,554 A * 10/1993 Tamor et al. ............ 123/188.3
5,277,542 A 1/1994 Nakanishi
5,370,364 A * 12/1994 Kenmoku et al. .......... 251/368

(Continued)

FOREIGN PATENT DOCUMENTS

CA 2138577 6/1995

(Continued)

*Primary Examiner*—Willis R. Wolfe, Jr.
(74) *Attorney, Agent, or Firm*—Warn, Hoffmann, Miller & Ozga, P.C.; Greg Dziegielewski

(57) ABSTRACT

Mechanical systems having anti-stick mediums applied thereto are provided. In one aspect, exhaust gas recirculation (EGR) valve systems having anti-stick mediums applied thereto are also provided. The anti-stick medium can be applied to any contacting surface, such as but not limited to the valve surface and/or the valve seat surface. The anti-stick medium is intended to prevent the valve surface and the valve seat surface sticking or bonding together, especially with respect to the operation of cooled or cold side EGR systems. If any materials should stick to the anti-stick medium, a portion of the anti-stick medium will break away from the surface, allowing the surface and/or component to function normally. The anti-stick medium can include, without limitation, boron nitride coatings, boron nitride aerosols, boron nitride greases, thin dense chrome platings, perfluoroalkoxy, and combinations thereof.

22 Claims, 7 Drawing Sheets

U.S. PATENT DOCUMENTS

| | | | | | |
|---|---|---|---|---|---|
| 5,426,936 | A | | 6/1995 | Levendis et al. | |
| 5,607,010 | A | | 3/1997 | Schönfeld et al. | |
| 5,655,493 | A | * | 8/1997 | Enright et al. | 123/188.3 |
| 5,771,873 | A | | 6/1998 | Potter et al. | |
| 5,785,030 | A | | 7/1998 | Paas | |
| 5,904,125 | A | * | 5/1999 | Enright et al. | 123/188.3 |
| 5,956,947 | A | | 9/1999 | Tanaka et al. | |
| 5,998,343 | A | | 12/1999 | Ishii | |
| 6,101,999 | A | | 8/2000 | Ohashi et al. | |
| 6,167,859 | B1 | * | 1/2001 | Strasser et al. | 123/188.3 |
| 6,272,913 | B1 | | 8/2001 | Naegele et al. | |
| 2002/0179034 | A1 | | 12/2002 | Sisken | |

FOREIGN PATENT DOCUMENTS

| | | | | |
|---|---|---|---|---|
| DE | 35 17 914 | A1 | | 11/1986 |
| GB | 2049483 | A | * | 12/1980 |
| JP | 62000603 | | | 1/1987 |

* cited by examiner

EXHAUST GAS RECIRCULATION VALVE

CROSS-REFERENCE TO RELATED APPLICATION

The instant application claims priority to U.S. Provisional Patent Application Ser. No. 60/600,844, filed Aug. 12, 2004, the entire specification of which is expressly incorporated herein by reference.

FIELD OF THE INVENTION

The present invention generally relates to exhaust gas recirculation valves, and more particularly to exhaust gas recirculation valve systems that include an anti-stick medium applied to either the valve poppet surface and/or the valve seat surface.

BACKGROUND OF THE INVENTION

Current Federal and State legislation generally requires control of vehicle exhaust emissions. Oxides of Nitrogen ("NOx") are one of the exhaust gas emissions that must be controlled. Formation of NOx typically occurs at higher combustion temperatures. A system, generally referred to as the exhaust gas recirculation ("EGR") system, has been developed to reduce peak combustion temperatures that reduce NOx emissions. An illustrative schematic of this system is generally shown in FIG. 1.

In this type of system, a portion of the exhaust gas is recirculated back to the intake manifold where it is combined with incoming charged air. When this mixture is compressed and ignited in the cylinder, the result is a lower combustion temperature and a reduction in NOx. The system typically consists of an EGR valve (1) that controls the flow of exhaust gas to the intake manifold. Conduits (2), (3), and (4) provide the interconnection between the exhaust manifold (5), EGR valve (1), and intake manifold (6). The system shown uses an electrically controlled EGR valve. An engine control unit ("ECU") (7) provides a signal that controls the open and/or closing of the valve. As the EGR valve (1) opens and closes, it will increase or decrease the flow rate of exhaust gas to the intake manifold (6). It is also typical to have a throttle valve (8) to control airflow into the intake manifold and, an exhaust gas cooler (9) to reduce temperature of recirculated exhaust gas.

The required EGR flow rate is dependent upon several factors that include the displacement of the engine and the pressure differential between the exhaust and the intake system. EGR valves may be actuated by pneumatic or electric means. Pneumatically actuated valves depend upon the availability of pressure or vacuum on the vehicle and this may be an undesirable requirement. They also require a means of electrically controlling the pneumatic source to allow overall electrical control of the system. An electric vacuum or pressure regulator is use to provide this control.

Operating force is another factor used in the selection criteria for the type of actuator used for the EGR valve. Higher flow rates require larger valves with greater area and higher operating forces. Lower pressure differential between the exhaust and intake manifold will require larger valves to achieve the desired flow rate. Components in the exhaust gas can accumulate on the valve components and cause them to stick or restrict movement if sufficient operating force is not available.

Referring to FIG. 2, a conventional EGR valve typically includes an actuator/valve assembly (10) and a valve base assembly (20). The EGR valve is typically mounted by fastening the valve body (20A) of the valve body assembly (20) to the intake manifold of the engine. A gasket is typically used as a seal to prevent leakage of exhaust gas to the environment. A valve poppet (30) is installed and retained on a valve stem (40) by any number of suitable methods, such as but not limited to radial riveting. The poppet valve (30) can be keyed to the shaft in a manner that will cause it to rotate with the shaft.

Still referring to FIG. 2, the valve base assembly (20) typically includes a valve seat (50) that is secured by suitable methods such as but not limited to press fit and/or staking. The actuator/valve assembly (10) and the valve body assembly (20) are combined to form the EGR valve. Fasteners (55) are used to secure the two assemblies together. Suitable locating features, in the actuator/valve assembly (10) and valve body assembly (20), are used to align the valve poppet (30) and valve seat (50) such that suitable sealing is provided when the valve poppet (30) is seated on the valve seat (50).

Referring to FIGS. 2 and 3, the EGR valve typically operates in the following manner. The ECU applies an electrical control signal to the actuator/valve assembly (10) that causes the valve poppet (30) to lift off of the valve seat (50). When there is a sufficient pressure differential between the inlet and outlet, the exhaust gas will flow through the EGR valve. The exhaust gas will flow from the inlet (60), into the chamber (70), through the valve seat (50), by the valve poppet (30), into the cavity (80), and to outlet (90). It should be appreciated the EGR system shown employs an EGR cooler that is operable to cool the exhaust gas prior to the exhaust gas reaching the EGR valve.

Components in the exhaust gas can accumulate on the valve components and cause them to stick or restrict movement if sufficient operating force is not available. By way of a non-limiting example, during normal operation of diesel engines, especially those employing cooled EGR systems, the EGR valve poppet often becomes stuck to the valve seat in the closed position, due to excessive build up of various exhaust gas components, which renders the valve inoperable.

More specifically, certain EGR systems that run with cooled exhaust gas (e.g., cooled or cold side EGR systems) may have a tendency to produce a moist vapor like (e.g., lacquer) material, until the engine warms up, which builds up on the valve poppet (30) and valve seat (50) as exhaust gas flows past them, as previously described. This material could combine with a powdery (e.g., soot) type of contamination that is present in the exhaust gas at elevated exhaust gas temperatures (e.g., greater than 140° C.). When the EGR valve is commanded to the closed position, the lacquer, soot or a combination of the two, starts to harden and causes a "bond" to be formed between the valve seat and poppet. This often happens after then engine is shut down for a time duration of about 20 minutes or greater. When the engine is started again, and the EGR valve is commanded to open, the "bond" that has formed prevents the EGR valve from opening when there is insufficient force and or torque available from the EGR valve to overcome the bonded sticking force.

Accordingly, there exists a need for new and improved EGR valve systems that are able to avoid sticking and/or bonding of the various surfaces of the components thereof, especially the valve poppet and valve seat surfaces.

SUMMARY OF THE INVENTION

In accordance with the general, teachings of the present invention, new and improved EGR valve systems are provided.

The EGR valve systems of the present invention preferably include an anti-stick medium that is applied to either a surface of a valve poppet and/or a surface of a valve seat of the EGR valve system. By "anti-stick medium," as that phrase is used herein, it is meant any material that will resist and/or prevent the accumulation of lacquer, soot, lacquer-like, or soot-like material on either the surface of the valve poppet and/or the surface of the valve seat of the EGR valve system. By "lacquer," "soot," "lacquer-like," or "soot-like" material, as those terms and/or phrases are used herein, it is meant any solid (e.g., particulate), fluid (e.g., liquids, gases, or the like) and/or condensable material that is capable of sticking, bonding, or otherwise adhering, either permanently and/or non-permanently, to either the surface of the valve poppet and/or the surface of the valve seat of the EGR valve system.

In accordance with a first embodiment of the present invention, a mechanical system is provided, comprising: (1) a first member; (2) a second member, wherein the first member is selectively operable to contact the second member; and (3) an anti-stick medium disposed on an external surface of either the first or second members, wherein the anti-stick medium is operable to substantially prevent material contained in a fluid from adhering to the external surface of either the first or second members, wherein the anti-stick medium is comprised of a material selected from the group consisting of boron nitride, thin dense chrome plating, perfluoralkoxy, and combination thereof.

In accordance with a second embodiment of the present invention, a mechanical system is provided, comprising: (1) a first member; (2) a second member, wherein the first member is selectively operable to contact the second member; and (3) an anti-stick medium disposed on an external surface of either the first or second members, wherein if the first and second members become at least partially stuck to one another, at least a portion of the anti-stick medium is operable to breakaway from itself so as to permit the first and second members to become unstuck from one another.

In accordance with a third embodiment of the present invention, an exhaust gas recirculation valve system is provided, comprising: (1) a valve member; (2) a valve seat member, wherein the valve member is selectively operable to contact the valve seat member; and (3) an anti-stick medium disposed on a surface of either the valve member and/or the valve seat member, wherein the anti-stick medium is comprised of a material selected from the group consisting of boron nitride, thin dense chrome plating, perfluoralkoxy, and combination thereof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
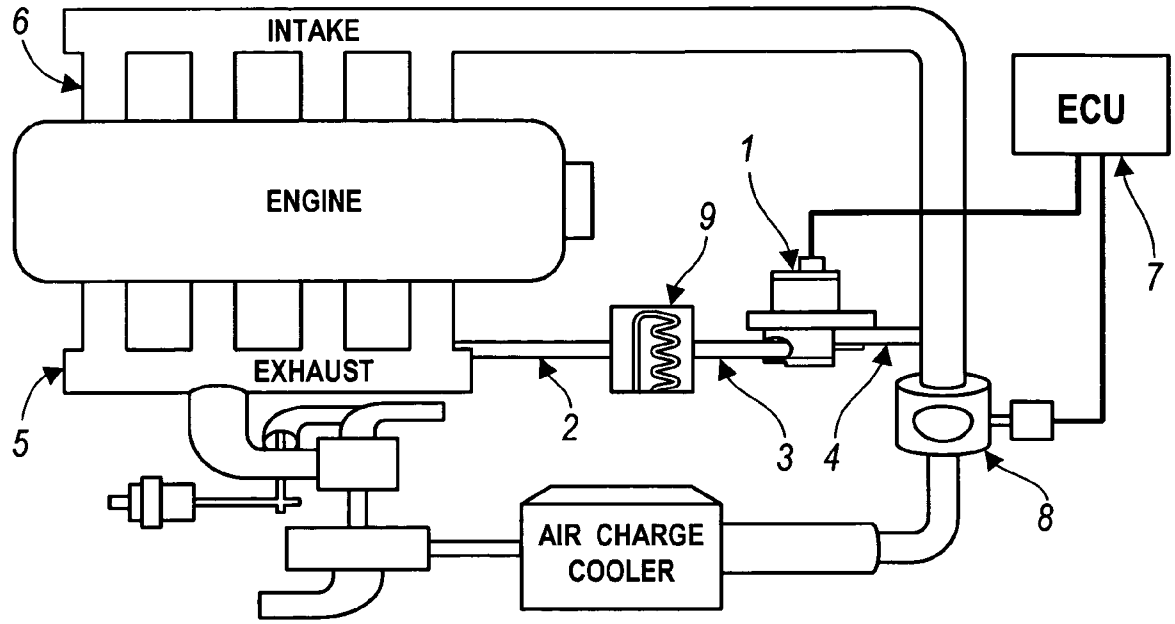
FIG. 1 (prior art)
FIG. 1 is a schematic view of a conventional EGR valve system, in accordance with the prior art.
Figure 2:
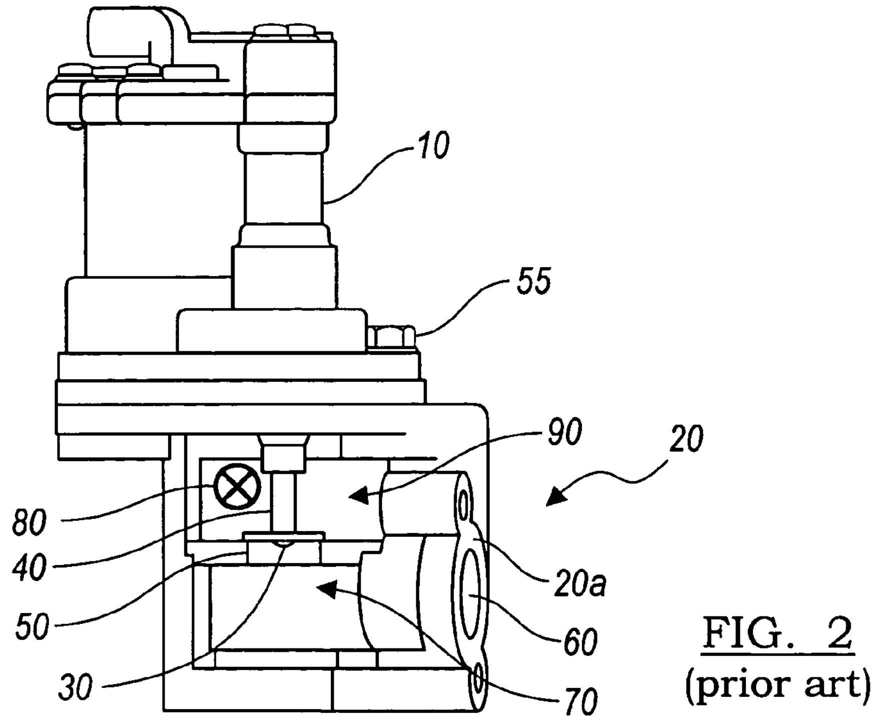
FIG. 2 (prior art)
FIG. 2 is a partial sectional view of a conventional EGR valve design, in accordance with the prior art.
Figure 3:
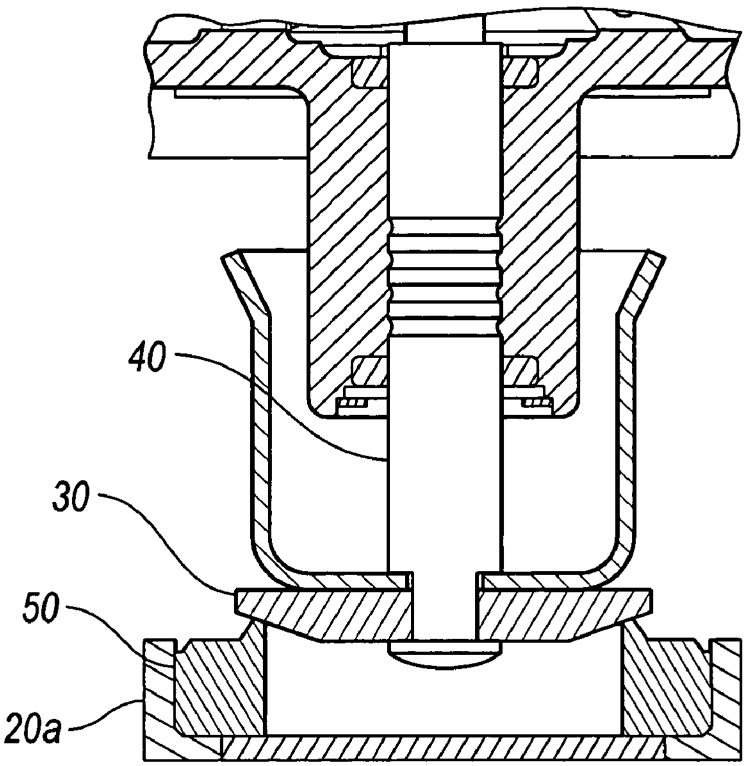
FIG. 3 (prior art)
FIG. 3 is a partial sectional view of a valve poppet and valve seat, in the closed position, of a conventional EGR valve design, in accordance with the prior art.
Figure 4:
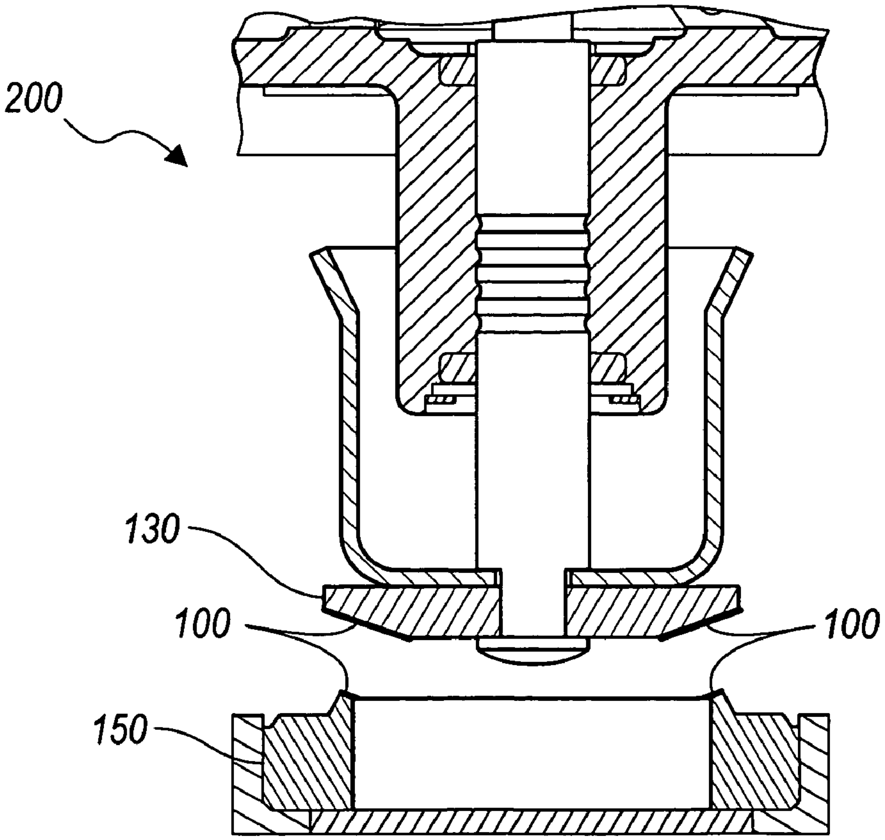
FIG. 4 is a partial sectional view of an EGR valve system, wherein an anti-stick medium has been applied to the valve poppet surface and the valve seat surface, in accordance with a first embodiment of the present invention.
Figure 5:
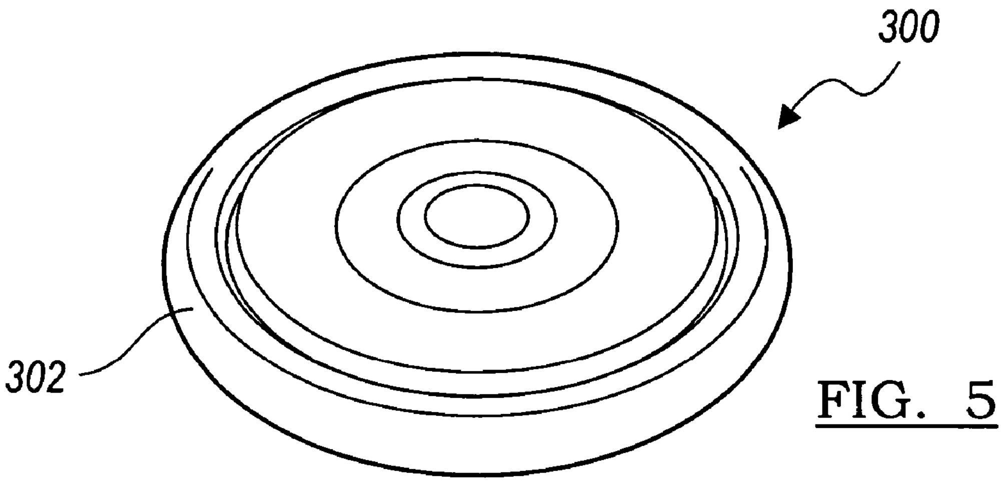
FIG. 5 is a perspective view of a valve poppet having a boron nitride-based anti-stick medium applied to a surface thereof, in accordance with a first alternative embodiment of the present invention.
Figure 6:
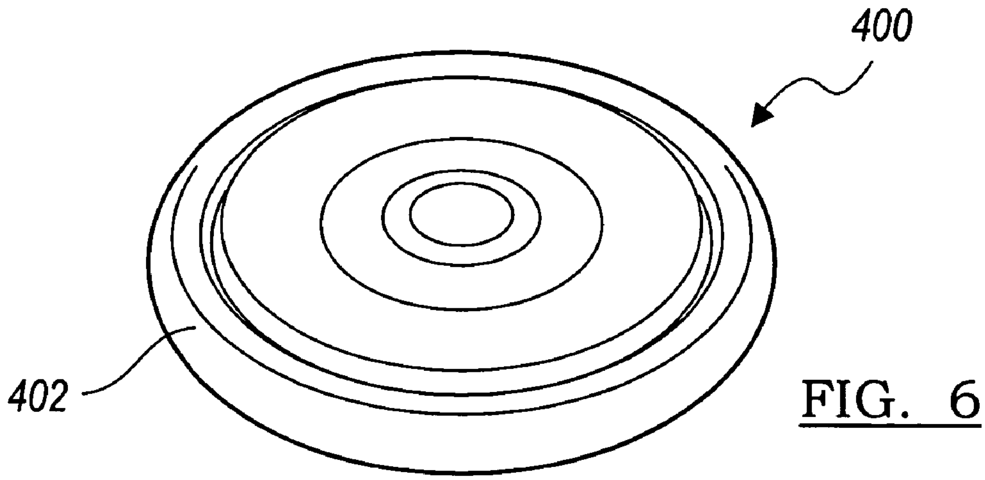
FIG. 6 is a perspective view of a valve poppet having a thin dense chrome plating anti-stick medium applied to a surface thereof, in accordance with a second alternative embodiment of the present invention.
Figure 7:
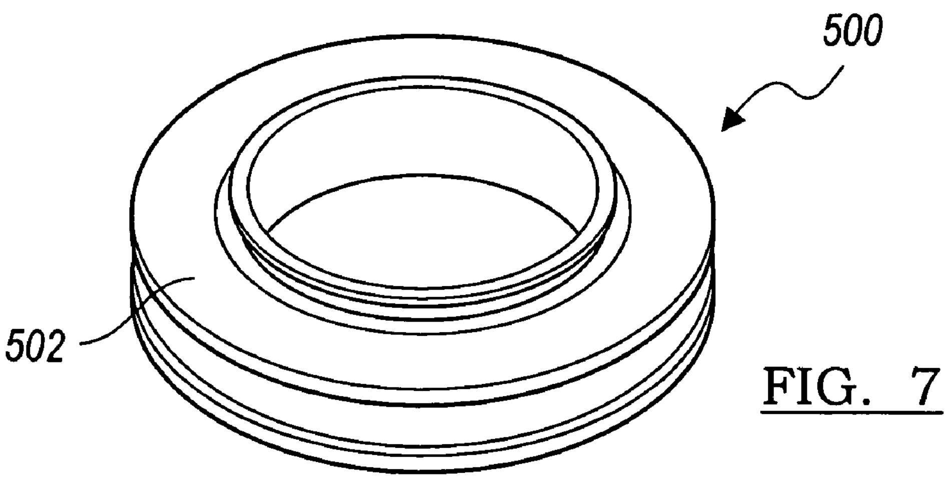
FIG. 7 is a perspective view of a valve seat having a thin dense chrome plating anti-stick medium applied to a surface thereof, in accordance with a third alternative embodiment of the present invention.

The following description of the preferred embodiment(s) is merely exemplary in nature and is in no way intended to limit the invention, its application, or uses.

In accordance with the general teachings of the present invention, an anti-stick medium is applied to an external surface of a member that contacts, regardless of orientation, action, or purpose, another member. The intended function of the anti-stick medium is to prevent the adherence, accumulation, bonding, and/or sticking of any contaminants (e.g., lacquer) or other undesirable materials contained or entrained in a fluid (e.g., exhaust gas) on the surfaces that have been coated with the anti-stick medium.

By way of a non-limiting example, an EGR valve system is provided, wherein an anti-stick medium is applied to the EGR valve components such as, but not limited to: (a) the valve (e.g., a poppet); (b) the valve seat; or (c) the valve and valve seat together. The present invention is particularly suitable for use with cooled or cold side EGR valve systems. However, it should be appreciated that the present invention can also be practiced with heated or hot side EGR valve systems, as well as any other type of valve system wherein accumulation of contaminants or other material on the components thereof is not desired.

In accordance with a preferred embodiment of the present invention, an anti-stick medium is applied to the EGR valve components such as, but not limited to: (a) the valve (e.g., poppet); (b) the valve seat; or (c) the valve and valve seat together. By way of a non-limiting example, the anti-stick medium of the present invention can be applied to all or substantially the entire exposed surfaces of the valve and/or valve seat, but can also be applied in a discontinuous pattern as well (e.g., dots, circles, ovals, stripes, chevrons, squares, rectangles, or the like). In accordance with a preferred embodiment, the anti-stick medium is preferably applied to the areas corresponding to the mating surfaces of the valve, valve seat, and combinations thereof, as well as areas adjacent thereto. The exact pattern and/or depth of the medium layer will vary, in part, depending on choice of medium type, application requirements, and/or cost considerations.

The anti-stick medium of the present invention can comprise, without limitation, compositions containing boron nitride, thin dense chrome plating, perfluoralkoxy (PFA), and combination thereof. The anti-stick medium of the present invention preferably impedes, hinders or otherwise prevents the sticking, bonding, adherence, or adhesion of the exhaust gas components to the EGR valve components, especially the valve poppet surface and/or the valve seat surface. In accordance with a preferred embodiment of the present invention, the anti-stick medium can be applied as an aerosol, grease, paint, coating, plating, and combinations thereof.

The thin dense chrome plating is readily commercially available from Electro-Coatings, Inc. (Berkeley, Calif.) under the trade name ELECTRALLOY. The nickel boron nitride coating is readily commercially available from Endura Coatings, Inc. (Warren, Mich.) under the trade name ENDURA 225. The aerosol-based boron nitride spray is readily commercially available from GE Advanced Ceramics, Inc. (Cleveland, Ohio). The boron nitride grease is readily commercially available from Lubrication Technology, Inc. (Jackson, Ohio) under the trade name CHRISTO-LUBE MCG 132 BN. The water-based boron nitride coating is readily commercially available from GE Advanced Ceramics, Inc. (Cleveland, Ohio). Additionally, ethanol-based boron nitride coating may be used in the practice of the present invention. The ethanol-based boron nitride coating is readily commercially available from Wacker Ceramics, Inc. (Munich, Germany) under the trade name EKA-MOLD. The PFA is readily commercially available from the Huni Company (Friedrichshafen, Germany) under the trade name PROCO-PFA.

The preferred method of application of the anti-stick medium to the EGR valve components can be, but is not limited to: (a) spraying; (b) dipping; (c) brushing; (d) plating; (e) primer coating with top coating; (f) electrochemical deposition; and/or (g) autocatalytic plating w/submicron sized lubricant particle dispersion. The application can be done on the separate components in a stand-alone setting or, alternatively, can be done once the components are assembled together, either completely or partially. The anti-stick medium can either be allowed to air dry, or alternatively, can be cured with the application of heat, depending on the material chosen and in accordance with the manufacturer's suggestions.

The EGR valve components also may be made from a lower grade of steel due to the anti-stick medium's anti-corrosion properties, which gives the potential for product cost savings.

Referring to FIGS. 4–7, there are shown various views wherein an anti-stick medium 100 has been applied to the surface of both the valve (e.g., poppet) 130 and the valve seat 150 (e.g., FIG. 4) of an EGR valve system 200, in accordance with a first embodiment of the present invention, the valve 300, 400, respectively, only with various anti-stick mediums, such as boron nitride-based materials 302 or thin dense chrome plating 402, respectively, (e.g., FIGS. 5–6), in accordance with first and second alternative embodiments of the present invention, or the valve seat 500 only with various anti-stick mediums, such as thin dense chrome plating 502 (e.g., FIG. 7), in accordance with a third alternative embodiment of the present invention.

It should be appreciated that the anti-stick mediums of the present invention can be applied to any type of contacting member, sealing member, and/or the like, in any number of applications other than for use with EGR valve systems. That is, the anti-stick mediums can be applied to any type of surface of any type of member that is intended to contact another member, especially where the problem of sticking between the members exists or can develop over time. For example, instead of the members contacting one another to provide a sealing function, the members can be rotationally engaged to one another, slidingly engaged to one another, and/or the like.

With respect to valve systems, the anti-stick medium of the present invention can be applied to various surfaces of butterfly valves, rotary discs, vanes, balls, drums, and/or other systems and/or components thereof.

Figure 8:
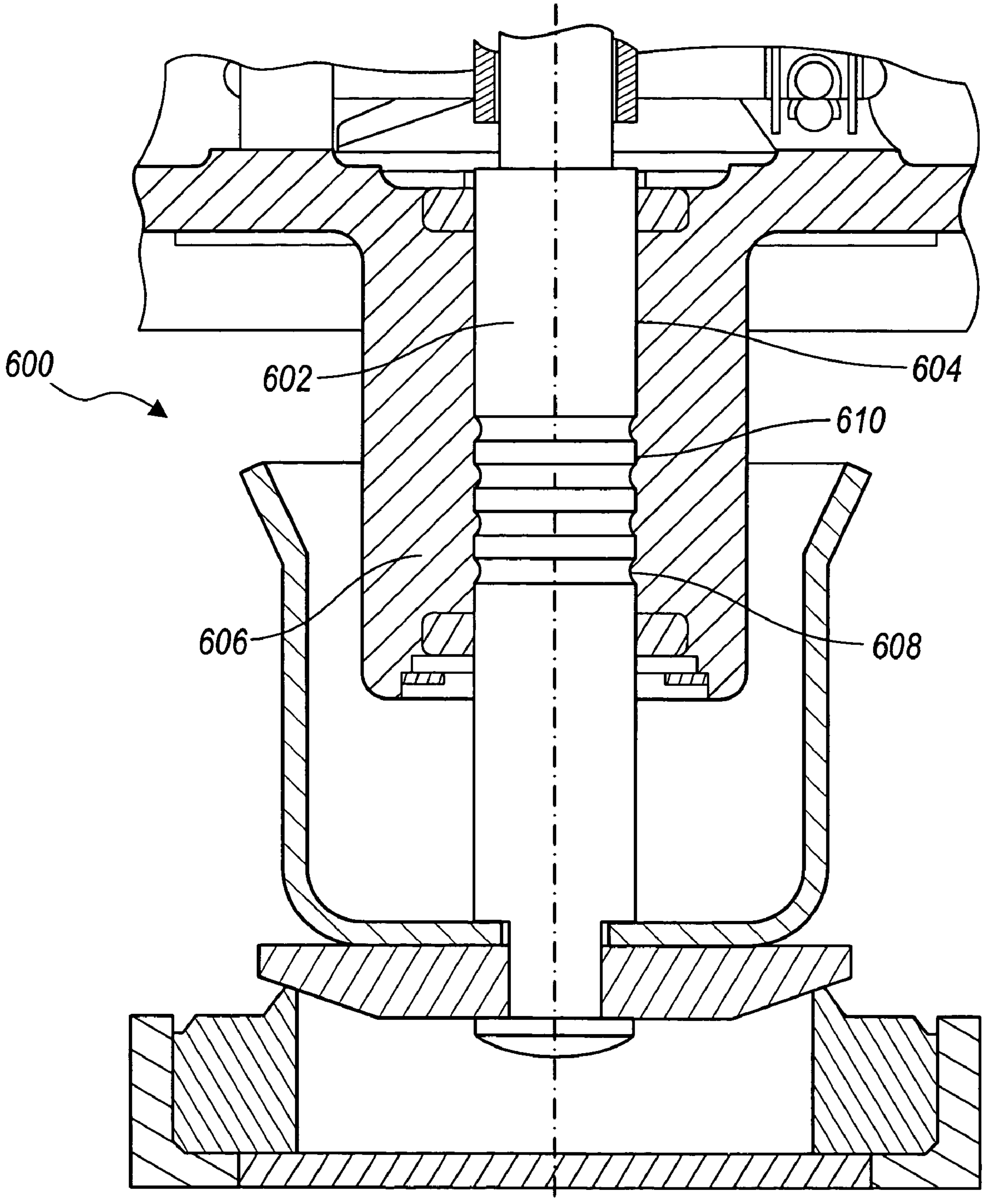
FIG. 8 is a sectional view of a valve system having an anti-stick medium applied to various surfaces thereof, in accordance with a fourth alternative embodiment of the present invention.

Referring to FIG. 8, there is shown a valve system 600 including a valve stem 602 having an outer diameter 604 and a valve stem bushing 606 having an inner diameter 608 enveloping the outer diameter 604 of the valve stem 602, in accordance with a fourth alternative embodiment of the present invention. By way of a non-limiting example, the anti-stick medium 610 of the present invention can be disposed on either the outer diameter 604 and/or the inner diameter 608. The anti-stick medium 610 can be comprised of any of the materials previously described, e.g., boron nitride, thin dense chrome plating, perfluoralkoxy (PFA), and combination thereof.

Figure 9:
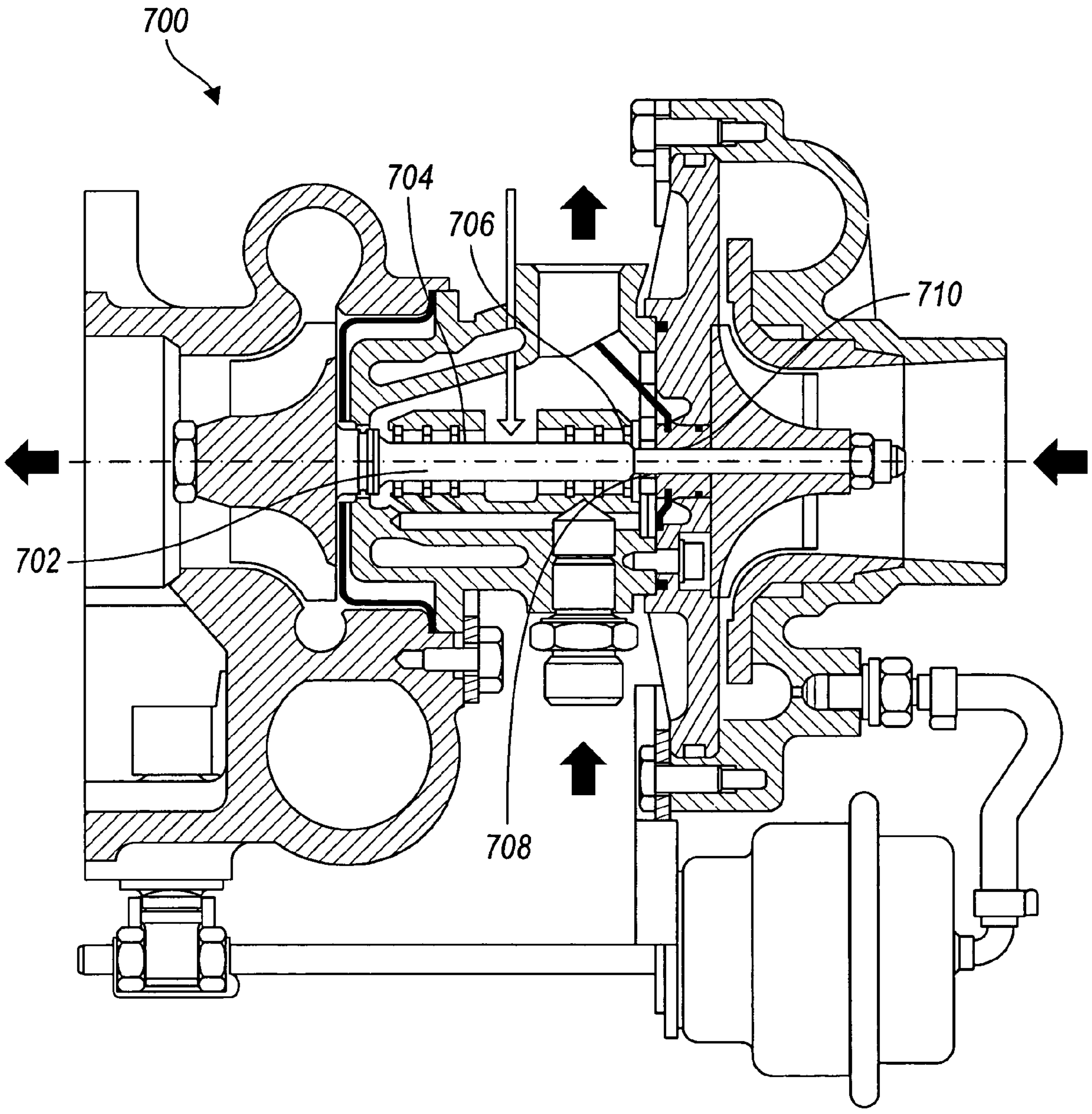
FIG. 9 is a sectional view of a turbocharger system having an anti-stick medium applied to various surfaces thereof, in accordance with a fifth alternative embodiment of the present invention.

Referring to FIG. 9, there is shown a turbocharger system 700 including a shaft member 702 having an outer diameter 704 engaged with a bearing member 706 having an inner diameter 708 enveloping the outer diameter 704 of the shaft member 702, in accordance with a fifth alternative embodiment of the present invention. By way of a non-limiting example, the anti-stick medium 710 of the present invention can be disposed on either the outer diameter 704 and/or the inner diameter 708. The anti-stick medium 710 can be comprised of any of the materials previously described, e.g., boron nitride, thin dense chrome plating, perfluoralkoxy (PFA), and combination thereof.

Figure 10:
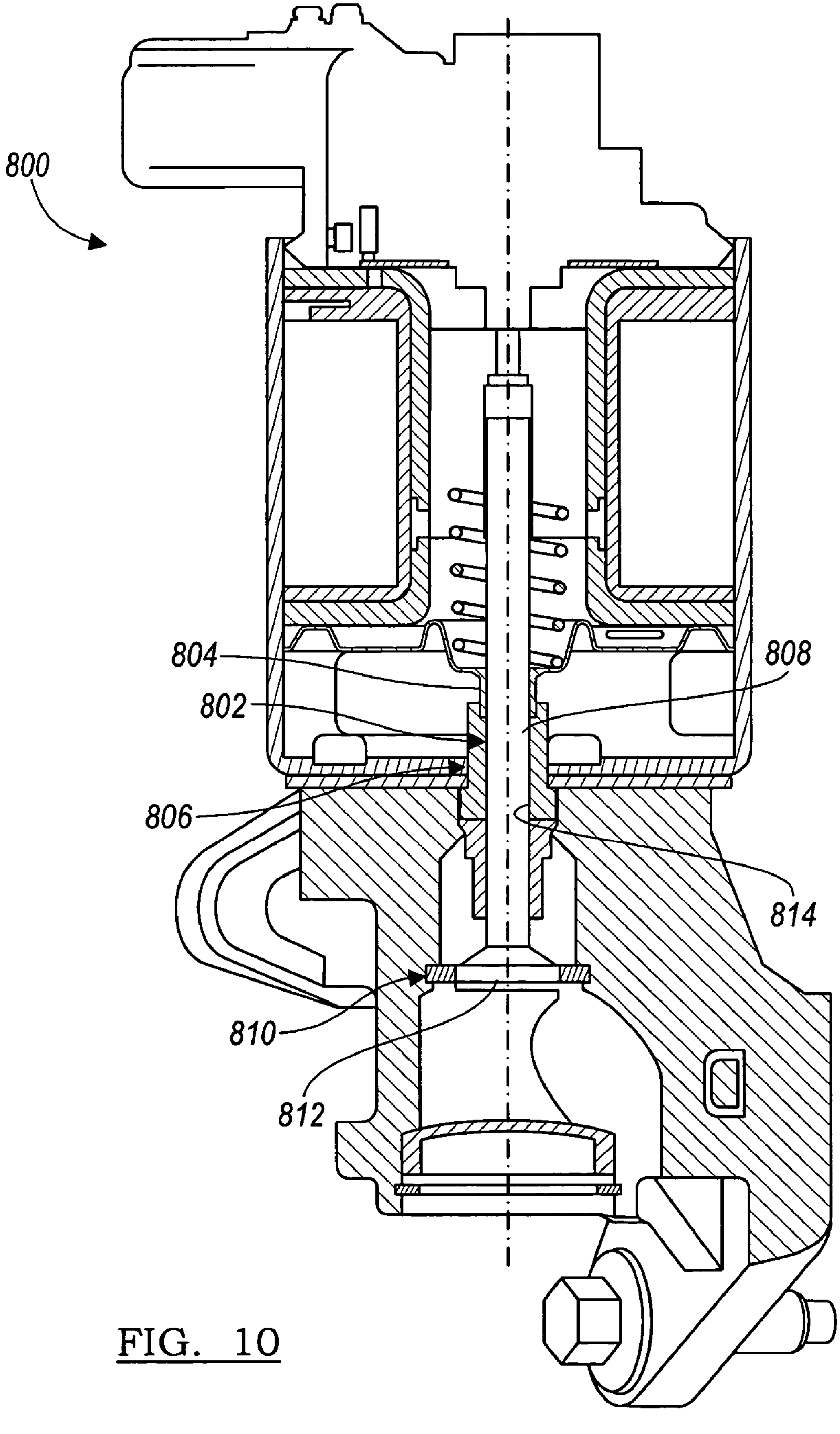
FIG. 10 is a sectional view of a gasoline engine solenoid EGR valve system having an anti-stick medium applied to various surfaces thereof, in accordance with a sixth alternative embodiment of the present invention.

Referring to FIG. 10, there is shown a gasoline engine solenoid EGR valve system 800 including a valve stem member 802 having an outer diameter 804 engaged with a valve stem bushing member 806 having an inner diameter 808 enveloping the outer diameter 804 of the valve stem member 802, and also engaged to a valve seat member 810 having an external surface 812, in accordance with a sixth alternative embodiment of the present invention. By way of a non-limiting example, the anti-stick medium 814 of the present invention can be disposed on the outer diameter 804, the inner diameter 808, and/or the external surface 812. The anti-stick medium 810 can be comprised of any of the materials previously described, e.g., boron nitride, thin dense chrome plating, perfluoralkoxy (PFA), and combination thereof. It should be appreciated that the anti-stick medium of the present invention can be used in vehicles employing diesel engines or gasoline engines, as well as hybrid vehicles employing one of these types of engine designs.

Figure 11:
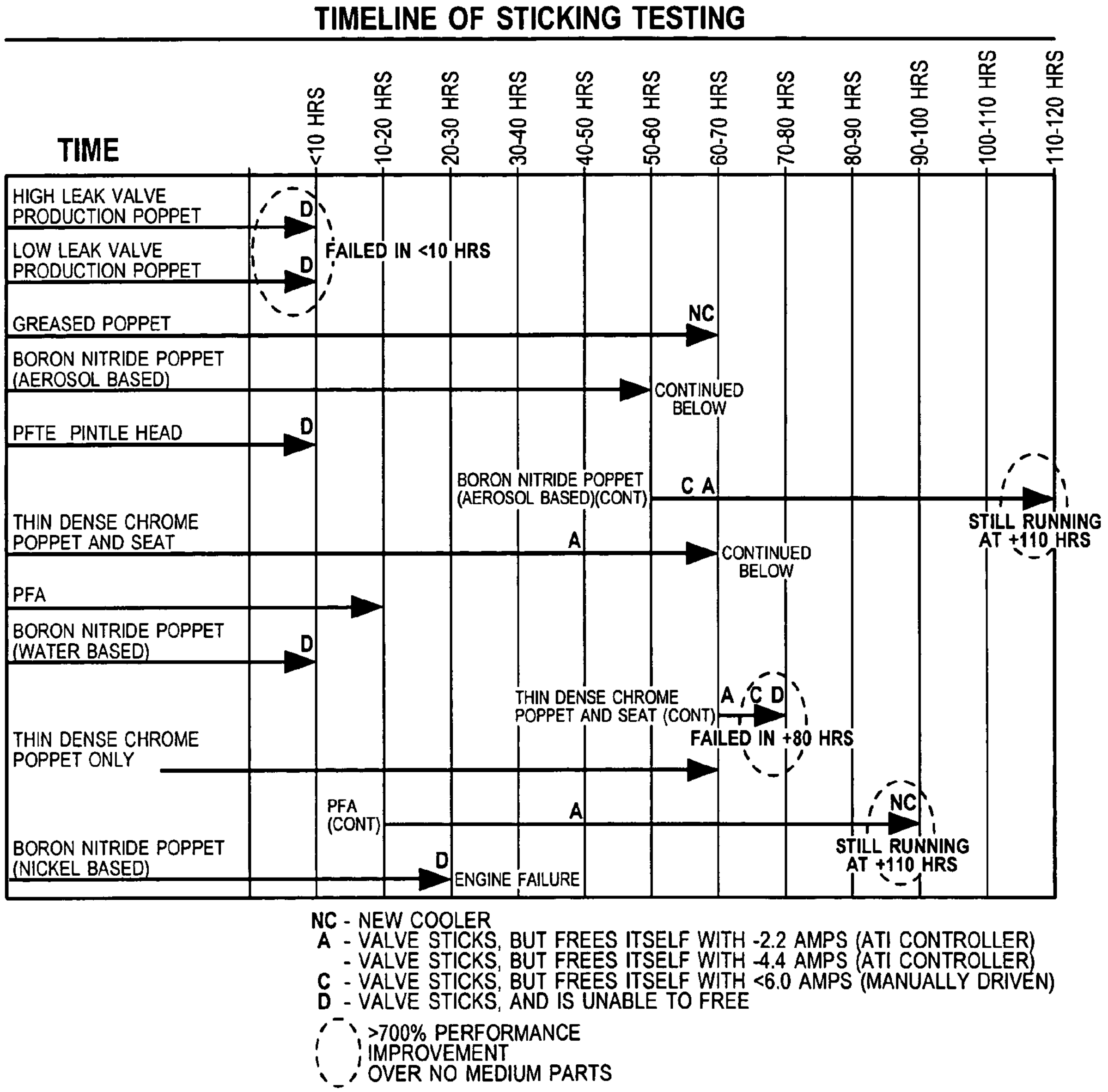
FIG. 11 is a graphical view comparing the performance characteristics of EGR valve systems with and without anti-stick mediums applied to various surfaces thereof, in accordance with a seventh alternative embodiment of the present invention.

Referring to FIG. 11, there is shown a graphical comparison of the performance characteristics of EGR valve systems with and without anti-stick mediums applied to various surfaces thereof, in accordance with a seventh alternative embodiment of the present invention. As FIG. 11 illustrates, those EGR valve systems that did not include an anti-stick medium disposed on the valve poppet, valve seat, or combination thereof, failed after a relatively short operational duration as compared to those EGR valve systems there were provided with an anti-stick medium in accordance with the general teachings of the present.

In accordance with another aspect of the present invention, if contaminants, such as exhaust gas components, actually do stick to the anti-stick medium of the present invention, it will greatly reduce the breakaway force required by one member to free it from the second member, i.e., should they become stuck to one another. For example, the breakaway force required by an actuator will be reduced to within the actuator's normal operating force range, thus allowing the two members to be pulled apart, thus allowing the valve to return to its normal intended functional characteristics.

Without being bound to a particular theory of the operation of the present invention, it is believed that the sacrificial nature of the anti-stick medium may be responsible for this breakaway feature. By way of a non-limiting example, the mechanical system's motion, whether it be linear (i.e., up and down), rotary, sheering and/or the like, can possibly remove small layers of the anti-stick medium when stuck together due, in part, to the relatively weaker bonds in the anti-stick medium as compared to the bonds between the contaminants themselves, e.g., the exhaust gas lacquer material. In this manner, the anti-stick medium can fracture, flake, chip, or otherwise break apart, from itself or from an adjacent anti-stick medium, thus freeing the previously stuck together members to resume their normal motion and function.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mechanical system, comprising:

a first member;

a second member, wherein the first member is selectively operable to contact the second member;

an anti-stick medium disposed on an external surface of either the first or second members;

wherein the anti-stick medium is operable to substantially prevent material contained in a fluid from adhering to the external surface of either the first or second members;

wherein the anti-stick medium is comprised of a material selected from the group consisting of boron nitride, thin dense chrome plating, perfluoralkoxy, and combination thereof; and wherein if the first and second members become at least partially stuck to one another, at least a portion of the anti-stick medium is operable to break away from itself so as to permit the first and second members to become unstuck from one another.

2. The invention according to claim 1, wherein the first member or second member is a sealing member.

3. The invention according to claim 1, wherein the first member or second member is selected from the group consisting of a valve member, a valve seat member, and combinations thereof.

4. The invention according to claim 1, wherein the fluid is exhaust gas.

5. The invention according to claim 1, wherein the material is exhaust gas lacquer.

6. The invention according to claim 1, wherein the mechanical system is incorporated into a system selected from the group consisting of a valve system, a solenoid valve system, an exhaust gas recirculation valve system, a turbocharger system, a gasoline engine, a diesel engine, and combinations thereof.

7. The invention according to claim 1, wherein the anti-stick medium is applied to the first or second members by a method selected from the group consisting of spraying, dipping, brushing, plating, coating, electrochemical deposition, autocatalytic plating, and combinations thereof.

8. A mechanical system, comprising:

a first member;

a second member, wherein the first member is selectively operable to contact the second member; and an anti-stick medium disposed on an external surface of either the first or second members;

wherein if the first and second members become at least partially stuck to one another, at least a portion of the anti-stick medium is operable to breakaway from itself so as to permit the first and second members to become unstuck from one another.

9. The invention according to claim 8, wherein the anti-stick medium is comprised of a material selected from the group consisting of boron nitride, thin dense chrome plating, perfluoralkoxy, and combination thereof.

10. The invention according to claim 8, wherein the first member or second member is a sealing member.

11. The invention according to claim 8, wherein the first member or second member is selected from the group consisting of a valve member, a valve seat member, and combinations thereof.

12. The invention according to claim 8, wherein the mechanical system is incorporated into a system selected from the group consisting of a valve system, a solenoid valve system, an exhaust gas recirculation valve system, a turbocharger system, a gasoline engine, a diesel engine, and combinations thereof.

13. The invention according to claim 8, wherein the anti-stick medium is applied to the first or second members by a method selected from the group consisting of spraying, dipping, brushing, plating, coating, electrochemical deposition, autocatalytic plating, and combinations thereof.

14. The invention according to claim 8, wherein the anti-stick medium is operable to substantially prevent material contained in a fluid from adhering to the external surface of either the first or second members.

15. The invention according to claim 14, wherein the fluid is exhaust gas.

16. The invention according to claim 14, wherein the material is exhaust gas lacquer.

17. An exhaust gas recirculation valve system, comprising:

a valve member;

a valve seat member, wherein the valve member is selectively operable to contact the valve seat member;

an anti-stick medium disposed on a surface of either the valve member and/or the valve seat member;

wherein the anti-stick medium is comprised of a material selected from the group consisting of boron nitride, thin dense chrome plating, perfluoralkoxy, and combination thereof; and wherein if the valve member and the valve seat member become at least partially stuck to one another, at least a portion of the anti-stick medium is operable to break away from itself so as to permit the valve member and the valve seat member to become unstuck from one another.

18. The invention according to claim 17, wherein the anti-stick medium is operable to substantially prevent material contained in a fluid from adhering to the external surface of either the valve member or the valve seat member.

19. The invention according to claim 17, wherein the fluid is exhaust gas.

20. The invention according to claim 17, wherein the material is exhaust gas lacquer.

21. The invention according to claim 17, wherein the mechanical system is incorporated into a system selected from the group consisting of a valve system, a solenoid valve system, an exhaust gas recirculation valve system, a turbocharger system, a gasoline engine, a diesel engine, and combinations thereof.

22. The invention according to claim 17, wherein the anti-stick medium is applied to the valve member or the valve seat member by a method selected from the group consisting of spraying, dipping, brushing, plating, coating, electrochemical deposition, autocatalytic plating, and combinations thereof.

* * * * *